United States Patent [19]
Eckstein

[11] 3,824,770
[45] July 23, 1974

[54] FILTERING DEVICE FOR REMOVING BACTERIA FROM THE VENTILATION AIR

[76] Inventor: Wolfgang Eckstein, Dorfstrasse 70, 2406 Sereetz, Germany

[22] Filed: July 2, 1973

[21] Appl. No.: 375,874

[30] Foreign Application Priority Data
July 6, 1972 Germany............................ 2233215

[52] U.S. Cl........................ 55/279, 21/53, 21/74 R, 55/242, 55/316, 55/338, 55/473, 137/599.1
[51] Int. Cl............................................ B01d 31/00
[58] Field of Search .......... 21/53, 58, 74 R; 55/279, 55/35, 242, 312–314, 316, 338, 473; 137/599.1

[56] References Cited
UNITED STATES PATENTS

| | | | |
|---|---|---|---|
| 2,169,043 | 8/1939 | Goehring | 137/599.1 |
| 2,303,331 | 12/1942 | Dauphinee | 21/53 |
| 3,279,151 | 10/1966 | Kauer, Jr. et al. | 55/33 |
| 3,418,068 | 12/1968 | Gilbertson | 21/53 |
| 3,493,323 | 2/1970 | Demulh | 21/53 |
| 3,528,781 | 9/1970 | Gelfman et al. | 21/53 |

Primary Examiner—Bernard Nozick
Attorney, Agent, or Firm—McGlew and Tuttle

[57] ABSTRACT

An air filtering device mounted in a ventilation system and provided to remove bacteria from the air current supplied into rooms to be held under sterile conditions comprises a suspension filter located in the air supply conduit and adapted to be shut off and connected into an air conducting disinfection circuit including a device furnishing a disinfectant in suspension and a fan circulating the air with the entrained disinfectant through the suspension filter. In the preferred embodiment, the disinfection circuit is branched to the ventilation air supply conduit upstream and downstream of the suspension filter by means of three-way control valves and the disinfection circuit comprises a vent permitting a flush air current pressed or sucked through the suspension filter and expelling the disinfectant after disinfection to escape. An electrical timing device or circuit controls the valves, the vent and the fan so that either only the filtered air is supplied, or only the disinfection of the suspension filter takes place, or only the suspension filter is passed through by a flush air current.

9 Claims, 1 Drawing Figure

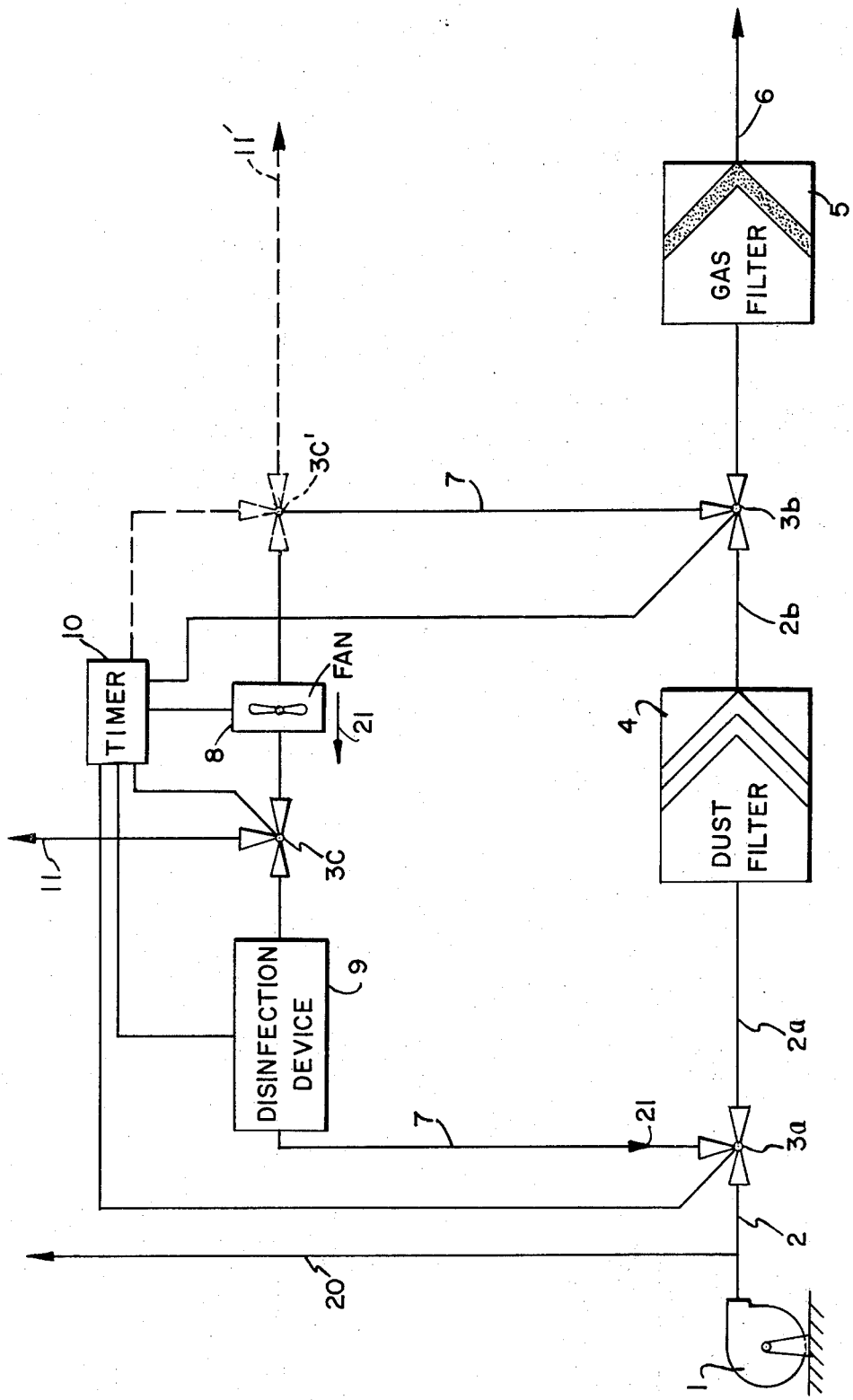

FILTERING DEVICE FOR REMOVING BACTERIA FROM THE VENTILATION AIR

BACKGROUND OF THE INVENTION

1. Field of the Invention

This invention relates, in general, to air purifying devices and, in particular, to a new and useful air filtering device for removing bacteria from the ventilation air current supplied into rooms having to be held under sterile conditions, such as operating theaters in hospitals or laboratories for preparing pharmaceuticals, comprising a filter for suspended matter and a desinfection device for the filter combined therewith.

2. Description of the Prior Art

To purify air supplied into sterile rooms from bacteria and viruses, it is possible to use suspension filters having a high separating capacity. The filtering medium of such filters are papers or fleeces composed of a mixture of coarse and fine fibers. Cellulose, linters, asbestos, glass and synthetic fibers are used as the starting material. It is a phenomenon common to all of these materials that the bacteria entering the filtering material are intercepted by the fine fibers. Suspended particles of inorganic matter remain on the location of their first interception, provided there is no action from the exterior, such as shocks or vibrations. Bacteria and viruses, on the contrary, especially where a nutritive substratum is present at the location of their interception, may grow. Under favorable conditions, it may happen that the developing bacteria colonies grow through the filtering material and appear also on the downstream side of the filter. There again under favorable conditions, such as vibrations of the filter, they may get loose and pass into the clean air current. In such a case, the filtered air contains a considerable amount of germs. It is proved that with a filter grown through by bacteria, it is impossible to obtain an air current completely free from noxious organisms.

In order to prevent the bacteria from growing through a filter, filtering matrials are used which are incapable of forming a nutritive substratum, such as glass fibers. It appears, however, that the air taken in for example, for the ventilation of hospitals, practically at all time contains so many dust particles of organic origin that even on the surface of the glass fibers a nutrient substratum for bacteria is formed. Consequently, even with such filtering materials which, because of their nature, are originally incapable to form a nutritive medium, a bacteria growth is possible after a certain service time.

Because bacteria may sometimes grow through a suspension filter very rapidly and thus considerably reduce the effective life of the filter, attempts have been made to impregnate the filtering media with disinfectants. However, the drawbacks continued to exist because not all of the bacteria species could be killed.

That is why the problem arose to provide a filtering device securely preventing the appearance of bacteria in the outflowing air.

SUMMARY OF THE INVENTION

In accordance with the invention, an improved filtering device is provided in which a suspension filter for removing bacteria from the air current is mounted in an air supply conduit adapted to be closed on both ends by shut-off valves and a disinfection circuit is branched to the upstream and downstream portions of this supply conduit, i.e. to both sides of the suspension filter, the branches being provided also with shut-off valves. The disinfection circuit includes an equipment for circulating the disinfectant. In a simplified embodiment of the invention, the shut-off valve of the upstream portion of the air supply conduit and the respective branching shut-off valve of the disinfection circuit as well as the shut-off valve of the downstream portion of the air supply conduit and the respective shut-off valve of the other branch of the disinfection circuit are united to three-way valves. This embodiment has the advantage of permitting the suspension filter to be cut off the ventilation system and connected to a disinfection equipment serving to kill the bacteria intercepted in the suspension filter and also the bacteria cultures grown through, without any intervention from the outside. The inventive arrangement securely prevents the occurrence of bacteria in the clean air.

According to the development of the invention, the disinfection equipment may comprise a device furnishing the disinfectant, for example an evaporator, atomizer, or the like, and a fan circulating air through the disinfection circuit and the suspension filter.

To facilitate the subsequent expulsion of the disinfectant from the suspension filter, it is possible, according to another development of the invention, to provide at the pressure side of the fan, between the fan and the device furnishing the disinfectant, venting means, preferably a three-way valve whose free outlet communicates with the outer atmosphere, preferably with a ventilation shaft. Thus, the disinfection period once terminated, the inlet of the air supply conduit can be reopened and the fan draws fresh air through the suspension filter. In passing through the filter, the fresh air current entrains the disinfectant and is expelled by the fan through the three-way valve, for example, into the ventilation shaft. The branch with the deivce furnishing the disinfectant is not included in this circuit.

It is also possible, according to a variation of this arrangement, to provide the venting three-way valve in the portion of the disinfection circuit extending between the suspension filter and the fan or to appropriately adapt the three-way valve mounted in the downstream portion of the air supply conduit. In such cases, after switching off the fan, the blower supplying fresh air urges the air through the filter and into the vent.

In order to prevent the residual disinfectant from passing into the clean air after restarting the ventilation, a gas filter may be provided at the outlet of the air supply conduit.

According to another development of the invention, the three-way valves and the fan may be controlled electrically and the control devices may be connected in a programmed timing circuit automatically switching on and off the ventilation, disinfection, etc.

In a simple embodiment of the invention, the switching program includes the following sequential valve positions:

a. A position of the three-way valves in which the ventilation air passes through the suspension filter into the room to be ventilated, the disinfection circuit is cut off and the fan is stopped.

b. A position of the three-way valves in which the suspension filter is cut off the outlet and inlet of the ventilation circuit and connected into the disinfection circuit and the fan is switched on;

c. A position of the three-way valves in which the inlet of the ventilation circuit is open, the outlet closed, the suspension filter connected in the disinfection circuit, and the vent open, the air current being circulated either by the fan or by the fresh air blower.

Accordingly, it is an object of the invention to proivde a filtering device for removing bacteria from the ventilation air supplied into room to be held under sterile conditions, comprising an air supply conduit provided with an inlet shut-off valve, an outlet shut-off valve, a filter for suspended matter mounted therebetween in the air current path, and a parallel air circulating conduit branched to the inlet and outlet portions of the air supply conduit limited by the shut-off valves and adapted to form along with the suspension filter a disinfection circuit also comprising a disinfection equipment, air propelling means, and shut-off valves permitting to separate the branched part of the disinfection circuit from the ventilation circuit.

Another object of the invention is to provide in the disinfection circuit venting means permitting to open the circuit to the outer atmosphere.

Another object of the invention is to provide on each side of the suspension filter three-way valves uniting the shut-off valves of the air supply conduit and the respective shut-off valves provided in the branchings of the disinfection circuit.

Another object of the invention is to provide a disinfection equipment comprising a device furnishing a disinfectant in a form suited for being entrained by the air current, and a fan as the air propelling means.

Another object of the invention is to provide the venting means in the form of a three-way valve mounted in the disinfection circuit between the device furnishing the disinfectant and the fan, i.e. at the pressure side of the fan, the free outlet of the valve leading preferably into a ventilation shaft.

Another object of the invention is to provide the venting three-way valve in the portion of the disinfection circuit extending between the suspension filter and the fan, i.e. at the suction side of the fan.

Another object of the invention is to provide at the outlet side of the suspension filter a three-way valve permitting to selectively shut-off the outlet of the air supply conduit or the branching of the disinfection circuit or open a vent.

Another object of the invention is to provide at the outlet of the air supply conduit, downstream of the shut-off valve, a gas filter for removing the residual disinfectant contained in the outflowing air.

Another object of the invention is to provide an electrical control of the three-way valves and air propelling means, connected to a programmed switching circuit.

Another object of the invention is to provide an electrical control switching circuit permitting to program a setting of the valves in which a) the inlet and outlet of the air supply conduit are open, the disinfection circuit and the vent are shut-off, and the fan is stopped; b) the inlet and outlet of the air supply conduit are closed, the disinfection circuit is established across the suspension filter, and the fan is in operation; and c) the inlet of the air supply conduit is open and the outlet closed, the disinfection circuit is open from the filter to the vent, and, preferably, the fan is in operation.

Still another object of the invention is to provide a device having the specified features, which is simple in design, rugged in construction and easy to manufacture and operate.

For an understanding of the principles of the invention, reference is made to the following description of a typical embodiment as illustrated in the accompanying drawing.

BRIEF DESCRIPTION OF THE DRAWING

In the drawing:

The single FIGURE is a schematical illustration of a device in accordance with the invention, in which the venting valve is located between the disinfection equipment and the fan.

GENERAL DESCRIPTION OF THE PREFERRED EMBODIMENT

Referring to the drawing, in particular, the invention embodied therein comprises a device for cleaning ventilation air, substantially including a ventilating or air supply circuit and a disinfection circuit. An propelling device or blower 1 presses the air to be purified through the air supply conduit 2 and the conditioning device in the direction of leading to a room to be ventilated. Control valves in the form of three-way valves 3a and 3b are provided in the air supply conduit 2 and a suspended matter filter 4 is mounted therebetween. Another air conduit 7 is branched off from the air conduit 2 by means of the valves 3a and 3b and a disinfection device 9 furnishing a disinfectant and a fan 8 are mounted in this conduit 7. A disinfection circuit is defined by the conduit 7 and the two portions 2a and 2b of the air supply conduit and the fan 8 intermittently propelling air in the direction 21, the device 9 furnishing the disinfectant to be entrained by the air current and the suspension filter 4 for intercepting all impurities and noxious organisms contained in the supplied air, are included therein. A third valve or venting valve 3c in the form of a three-way valve is mounted in the portion of conduit 7 extending between the device 9 and the fan 8. The free outlet of this valve is connected to a venting pipe 11 leading to the outer atmosphere, preferably into a ventilation shaft. In an alternative arrangement, this venting valve 3c is provided in the portion of the disinfection circuit between the fan 8 and the suspension filter 4 as indicated, for example, at 3c' in dashed lines. A gas filter 5 is provided in the ventilation air path, at the outlet of the air supply conduit 2.

In normal service, the air current to be purified is pressed by the blower 1 through the inlet portion of the conduit 2, the valve 3a, the suspension filter 5, the valve 3b, and the gas filter 5 in the direction 6 to the room to be ventilated. In the rest time, i.e. when the ventilation of the room may be stopped, for example during the night, the suspension filter 4 can be disinfected, whereby the germs accumulated therein are killed. In the present example, the disinfectant, such as formaldehyde, ammonia, or similar gaseous substances, is furnished by the equipment 9 in gaseous or vapor state. An automatic timer device 10 is connected to the fans 1 and 8 and the disinfecting device 9 and to valves 3a, 3b and 3c to carry out a predetermined program of normal operation and disinfecting operation. To start the disinfection, the timing circuit switches over and causes the valves 3a and 3b to change from their ventilation positions (flow from fan 1 through conduit 2, valve 3a, conduit 2a, filter 4, conduit 2b, valve 3b, and filter 5) into the disinfection positions for flow through the branch conduit 7. Simultaneously, the fan 8 is started and, if necessary, the disinfection device 9 is started to furnish the disinfectant. Owing to the action of fan 8, air is now circulated in the disinfection circuit, entrains the disinfectant from the device 9 and passes it through the suspension filter 4. The circulated air volume remains constant because the circular is clsoed to the outside. At the end of the disinfection period, which is predetermined in the timing device 10, valve 3a is returned to a position interconnecting conduits 2 and 2a and valve 3c interconnects conduits 7 and the vent line 11 while valve 3b is positioned to connect conduits 2b and 7. Consequently, due to the suction produced by the fan 8 which is still running, fresh air is taken in through the inlet of the air supply, conduit 2 and through the suspension filter 4, whereby the disinfectant present or deposited in the filter and other parts of the circuit is entrained and expelled through the valve 3c and the venting pipe 11 into the ventilation shaft.

As indicated, an additional venting valve 3c' may also be provided in the circuit portion between the suspension filter 4 and the fan 8, particularly between the valve 3b and the fan. In such a case, air is not taken by the fan 8 which may be stopped, but pressed by the blower 1 through the suspension filter 4 and escapes though the venting pipe 11'.

After the disinfectant has been expelled from the filter and the adjacent portions of the air supply conduit, the timing circuit switches to the ventilation again so that valves 3a, 3b and 3c return into their operation positions and fan 8 is stopped.

The gas filter 5 serves to remove the residual disinfectant still contained in the clean air current. The indicated conduit 20 permits the blower 1 to additionally supply other air conduits or a plurality of similar devices.

While a specific embodiment of the invention has been shown and described in detail to illustrate the application of the principles of the invention, it will be understood that the invention may be embodied otherwise without departing from such principles.

What is claimed is:

1. An air filtering device for removing bacteria from the ventilation air current supplied into rooms to be held under sterile conditions, such as operating theaters in hospitals, laboratories for preparing pharmaceuticals, etc., comprising a ventilation circuit defined by an air supply conduit including a portion limited by an air inlet and a conditioned air outlet, a suspended matter filter in said air supply conduit and a branch disinfection line connected to said air supply conduit on each side of said filter and first and second control valves connected between said air supply conduit and said branch line on each respective sides of said filter, a disinfection device adapted to circulate a disinfectant in said branch line through said filter, said first and second control valves being selectively operable to connect said branch conduit to said air supply conduit.

2. An air filtering device, according to claim 1, including a gas filter for removing residual disinfectant contained in said air supply conduit downstream of said filter.

3. An air filtering device for removing bacteria, according to claim 1, wherein said first and second valves are three-way valves.

4. An air filtering device for removing bacteria, according to claim 3, wherein said disinfection device comprises means for directing a disinfecting liquid into the air stream, and a fan for producing an air stream flow through said branch line and through said suspended matter filter when said first and second valves are set to connect said disinfecting line and the portion of said air supply with said filter together.

5. An air filtering device, according to claim 3, wherein the disinfection line comprises venting means, and a three-way venting valve connected between said disinfecting line and said venting means permitting venting to the atmosphere.

6. An air filtering device, according to claim 5, wherein said venting means is located between said disinfecting device and said fan.

7. An air filtering device for removing bacteria, according to claim 5, including a timing device connected to said first and second control valves, said fan and said disinfecting device and permitting the following operating positions:
   a. a position of said first and second control valves in which the inelt and outlet of the air supply control are open, the disinfection equipment is cut off and the vent is closed, so that supplied air flows through the suspended matter filter to the room to be ventilated;
   b. a position of the valves in which the inlet and outlet of the air supply conduit are closed, the suspended matter filter is connected into the disinfection circuit, the vent is closed, the fan is switched on and the device furnishing the disinfection is in operation, so that only the air contained in the disinfection circuit and entraining the disinfectant is circulated through the suspended matter filter;
   c. a position of the valves in which the inlet of the air supply conduit is open, the outlet of this conduit is closed, the branch of the disinfection circuit extending from the device furnishing the disinfectant to the inlet side of the filter is shut-off, the device furnishing the disinfectant is out of operation, the vent is open and, in case the vent is located at the pressure side of the fan, the fan is switched on, so that fresh air flows through the suspended matter filter entraining the disinfectant and escapes through the vent.

8. An air filtering device, according to claim 5, wherein said venting means is lccated between said fan and said suspended matter filter.

9. An air filtering device, according to claim 8, wherein said venting means is combined with said second control valve and is located downstream of said suspended matter filter.

* * * * *